United States Patent [19]

Lange et al.

[11] 3,847,635

[45] Nov. 12, 1974

[54] THIXOTROPIC CEMENTITIOUS COMPOSITION AND PROCESS

[75] Inventors: Robert G. Lange, Bensenville, Ill.; Walter D. Kobeski, Malcolm Springs, W. Va.

[73] Assignee: United States Gypsum Company, Chicago, Ill.

[22] Filed: July 18, 1973

[21] Appl. No.: 380,521

[52] U.S. Cl. .................................. 106/110, 106/89
[51] Int. Cl. ............................................ C04b 11/00
[58] Field of Search ............................. 106/89, 110

[56] References Cited
UNITED STATES PATENTS

| | | | |
|---|---|---|---|
| 3,582,376 | 6/1971 | Ames | 106/90 |
| 2,508,480 | 5/1950 | Ainsworth | 106/111 |
| 2,228,164 | 1/1941 | Grandell | 106/110 |
| 2,001,506 | 5/1935 | Smitt | 106/89 |

*Primary Examiner*—Delbert E. Gantz
*Assistant Examiner*—John P. Sheehan
*Attorney, Agent, or Firm*—Kenneth E. Roberts, Esq.; Stanton T. Hadley, Esq.; Samuel Kurlandsky, Esq.

[57] ABSTRACT

Cementitious mixtures of alpha calcium sulfate hemihydrate, portland cement and a dispersing agent are rendered thixotropic by the inclusion of small amounts of crystallized magnesium sulfate.

12 Claims, No Drawings

3,847,635

THIXOTROPIC CEMENTITIOUS COMPOSITION AND PROCESS

BACKGROUND OF THE INVENTION

This invention concerns improvements in quick-setting, high-strength cementitious compositions of the type containing, as major ingredients, alpha calcium sulfate hemihydrate and a portland cement, along with minor quantities of a fluidizing agent, or dispersant. More particularly, this invention is concerned with improving such compositions by providing them with thixotropic characteristics.

Since about the end of Word War II, there has been increasing concern with attempts to combine the desirable properties of an hydraulic cement, such as the various portland cements, with the desirable properties of a non-hydraulic cement, such as calcium sulfate hemihydrate ($CaSO_4 \cdot \frac{1}{2} H_2O$). Portland cements have the advantages of being hydraulic, and also of developing very high strengths. Gypsum cements, such as are involved in the hydration of calcium sulfate hemihydrate upon mixing with water to form a settable plastic mass and hydrating to the dihydrate form, have the advantage of being quick-setting with higher initial compressive strengths. Further, when the alpha hemihydrate form of calcium sulfate hemihydrate is used in contrast to the beta hemihydrate form, higher strengths are developed. It has been found that when various combinations of these two materials are made, such are practical for handling purposes only with the inclusion of a fluidizing agent, or a dispersant; for example as illustrated in U.S. Pat. No. 3,582,376.

While such quick-setting, high-strength cementitious compositions have found ready acceptance in the marketplace for many variant uses, they are however not without their disadvantages. For instance, the necessity of including a fluidizing agent has caused these cementitious compositions, when mixed with water to form a plastic mass, to exhibit dilatant flow characteristics. That is, the aqueous suspension exhibits inverse thixotropy, or dilatancy, and thus tends to set solid under the influence of pressure. Thus, the plastic mass while setting, is self-leveling; and any attempts to cast the material on an incline, or to fill a void in a sloping roadway, or in any attempt at "slush casting" would be defeated. Slush casting is the term applied to the art of forming a hollow set plastic cast by pouring a quantity of the plastic slurry into a hollow object mold, and then turning or rotating the mold to spread the plastic mass relatively evenly over the inside surfaces of the mold while the plastic mass is setting.

While the inclusion of a dispersing agent has increased the ease of handling and pumpability of such cementitious mixtures; this modification has engendered other problems including rendering the plastic mass dilatant. Normally both calcium sulfate hemihydrate cements and portland cements in the plastic state are somewhat thixotropic; but upon the inclusion of the fluidizing agent they are rendered dilatant. This has placed a limitation upon certain of the possible end uses of the materials.

It is known to include minor amounts of magnesium sulfates into portland cement compositions to impart certain properties thereto such as accelerating the set. For example, see U.S. Pat. Nos. 1,901,890; and 2,508,480. In addition, it is also known to include minor amounts of magnesium sulfate materials into calcium sulfate hemihydrate formulations to enhance certain characteristics; such as in U.S. Pat. Nos. 1,256,324 and 1,907,809. In addition, U.S. Pat. No. 3,262,798 illustrates an aluminous cement to which has been added small amounts of crystallized magnesium sulfate. Further, U.S. Pat. No. 2,508,480 illustrates one instance where a portland cement and a calcium sulfate mixture contains some amount of magnesium sulfate. In this latter-mentioned patent it is unclear whether the calcium sulfate is present as the dihydrate, anhydrite form or one of the forms of hemihydrate. Without regard thereto, it is apparent in each of the afore-mentioned patents that no fluidizing agent is present and thus that there is no dilatant characteristic to be overcome in those materials including magnesium sulfate.

Magnesium sulfate in combination with portland cements can vary the setting time and also causes some expansion. Generally amounts should be quite limited as this can cause fluorescing and ASTM standards put a limitation on the amount of these materials that may be included in portland cement compositions for particular uses.

By thixotropy is meant the property of certain gels and gel-like materials to become fluid on agitation and to become highly viscous or coagulating again when at rest. Thus thixotropy is a term used to describe an isothermal, reversible, sol-gel type transformation wherein the gel may be liquified to a sol simply by agitation and the sol sets to a gel again when left at rest. When applied to aqueous suspension, such as a cementitious material herein under consideration, the incorporation of this characteristic would allow the dilatant cementitious masses a wider application of usage. Thus, for example, the dilatant cementitious masses could be pumped to a point of application, and then made thixotropic for usage. The cementitious mass would then go from a fluid material to a plastic mass which could then be placed in the usage as though it were a stiff portland cement mortar. For example this would have particular application in usage as key grouting and floor filling where it would be desirable to pump the material to the point of usage and then keep it from flowing out. Further, road patching could be performed on steeply inclined roadways, and slush casting of these materials would be possible. When the cementitious mass would be agitated it would be sufficiently fluidized to fill the voids, and once into the voids it would come to rest, thus allowing it to be screeded to an angle and to set at an angle conforming to the key grout, roadway, etc. Further important characteristics to be attained would be the ability to be readily screedable to a smooth surface.

SUMMARY OF THE INVENTION

It is therefore one object and advantage of the present invention to provide alpha calcium sulfate hemihydrate-portland cement cementitious compositions which will exhibit thixotropic properties in contradistinction to the usual dilatancy of such compositions.

Another object is the provision of improved alpha calcium sulfate hemihydrate-portland cement cementitious materials which when mixed with water will readily flow when energy is applied and which will not flow when the energy application has ceased.

A further object is the provision of alpha calcium sulfate hemihydrate-portland cement cementitious compositions which will remain dilatant, and pumpable, until the point of usage or application, at which point the dilatant flow characteristics may be changed into thixotropic flow characteristics.

Still another object is the provision of alpha calcium sulfate hemihydrate-portland cement compositions which may be readily poured at for example a 5 percent incline with no flowing problems, and thus may be used for paving or road patching where a pitch is desired to the paving or patch.

Still another object is to change the dilatant flow characteristics of alpha calcium sulfate hemihydrate-portland cement cementitious compositions into a thixotropic flow characteristic, thereby making the compositions more suitable for slush casting and the like.

A still further object is the provision of alpha calcium sulfate hemihydrate-portland cement compositions which undergo, during setting, less expansion than heretofore; and which have increased chemical-resistance characteristics.

The fulfillment of these and other objects and advantages of the present invention are accomplished by adding a minor amount by weight of magnesium sulfate to such cementitious compositions and, more particularly, in one preferred embodiment, by adding about 0.2–0.5 percent by weight of crystallized magnesium sulfate to an aqueous slurry containing, on a dry weight basis, about 49–94 percent alpha calcium sulfate hemihydrate, about 49–5 percent of a portland cement; and about 0.5–0.8 percent of a fluidizing agent. When the crystallized magnesium sulfate is added to a dry blend of the cementitious materials, slightly more of the magnesium sulfate should be used because it is dry and fewer active sites on the material are available to the cementitious mass than when it is wet and more dissolved in water; and where the magnesium sulfate is being metered into the spray nozzle of an aqueous slurry of the cementitious material being sprayed or pumped, then it is preferred to add slightly less of the magnesium sulfate than set forth hereinabove. It was surprisingly found that the dilatant flow characteristics of the cementitious slurry were changed by the addition of the small amounts of magnesium sulfate, with virtually no effect on consistency, strength or pumpability of the materials. Surprisingly, the magnesium sulfate addition turned the dilatant cementitious mixture into a thixotropic slurry which would flow only when energy was applied and which would not flow when the energy application ceased.

The alpha calcium sulfate hemihydrate material is commonly called alpha gypsum. Typical methods of producing alpha gypsum are disclosed in U.S. Pat. Nos. 1,901,051 and 3,423,172.

The portland cement ingredient may be any of the available types. Type I portland cement is preferred for reasons of economy and availability; although, for example, other types may be used such as Type V for increased chemical resistance of the resultant composition.

Among the suitable dispersing agents or fluidizing agents, which are necessary to impart the initial dilatant characteristics, are LOMAR D, which is a condensate of naphthalene sulfonic acids and formaldehyde, offered by the Nopco Chemical Company, Newark, N.J., and other similar dispersing agents under the LOMAR brand; BLANCOL which is a sulfonated condensate of formaldehyde and naphthalene, offered by the Antara Chemicals Division of General Dyestuff Corporation, New York, N.Y.; and guar gum. Any of the known fluidizing or dispersing agents for cementitious materials can be used in the practice of the present invention. The fluidizing agent is added in the customary amounts, generally about 0.5–0.8 percent by weight of the total dry mixture. Somewhat more or less may be used but without further substantial advantages.

Although the magnesium sulfate ingredient may be in any of the different state of hydration forms, it is preferred to use the heptahydrate, commonly called crystallized magnesium sulfate and also commonly known as Epsom salts. The amount of crystallized magnesium sulfate to be used depends on the amount of fluidizing or dispersing agent also used in the cementitious mass, thus it is generally preferred to employ about 0.2–0.5 percent by weight of the total dry mixture; although somewhat more or less may be used but without further substantial advantage.

The order of combining the materials is not critical, and they may be combined in any order. Dry blending of the alpha hemihydrate, portland cement, fluidizing agent and crystallized magnesium sulfate is preferred for providing a packaged dry blend product. As stated above, the crystallized magnesium sulfate may be added at the time of mixing with water, and here the magnesium sulfate may be added to the dry blend or simultaneously with water in batch usage, and for continuous pumped and sprayed application may be metered in through the nozzle of the sprayer. The amount of water to be combined with the dry blend of ingredients to obtain a plastic mass can vary greatly. Generally it is preferred to add only about that amount of water which will give a pourable slurry, hereinafter called normal consistency or that water/cementitious material demand ratio characterized in cubic centimeters of water per 100 grams of cementitious material to just provide a pourable slurry. It is generally satisfactory to provide water which will give a 20–30 cc. consistency for the materials of the present invention. In the following specific examples consistency was determined without or before the magnesium sulfate addition.

This invention will now be further described by reference to specific examples for the purpose of further illustrating and disclosing the present invention, and the examples are in no way to be construed as limitations thereon. All parts are by weight unless otherwise indicated. In the following specific examples mention is made of a 300 gram Vicat set test. The test procedure involved use of a standard Vicat needle of 300 gram weight with a point 1 mm. in diameter per ASTM Standard C 472. The cementitious materials are added to mixing water to obtain desired consistency and an amount of the slurry is poured into a waxed paper cup to give a cementitious mass in the cup of about a 1-inch thickness. When the mass has begun to stiffen and lose gloss, the needle is gently placed on the surface of the mass and released to penetrate freely of its own weight. The set is measured from the time the first of the dry ingredients is added to the mixing water; and set is called when the needle no longer penetrates to the bottom of the cementitious mass, generally when the needle will not penetrate through half the height of the sample.

EXAMPLE 1

The following materials, in the percentages by weight given, were dry blended to form a neat cementitious blend:

94% alpha calcium sulfate hemihydrate
5% Type I portland cement
0.5–0.75% LOMAR D dispersing agent.

To aliquots of the above blends were added 0.25 percent (or about 8 pounds per ton) of crystallized magnesium sulfate. Then both the neat material and the material to which the magnesium sulfate had been added were mixed with water and expansion and temperature rise tests were conducted, with the following results:

|  | Neat Cementitious Mass | Cementitious Mass + $MgSO_4 \cdot 7H_2O$ |
|---|---|---|
| Mix Consistency | 24 cc. | 24 cc. |
| 300 gram Vicat set | 26 minutes | 16 minutes |
| maximum expansion | 0.218% | 0.179% |
| maximum temperature rise | 61.7°C | 66.5°C |

From the above it is clearly evident that the magnesium sulfate addition produced a shorter set time and a higher temperature rise, and more importantly decreased the total expansion by 18.3 percent. To further show the effect of the magnesium sulfate in eliminating the dilatant property of the neat material, the following test on flowing characteristics and screedability of the material was conducted.

This test involved pouring material on a non-absorbant surface at a 5 percent incline. Aliquots of the neat cement and cement plus magnesium sulfate prepared above were poured onto a felt covered piece of board that had three sides of the board provided with a ⅝-inch frame. The materials were poured onto the boards at the top and permitted to flow down the 5 percent incline. The frame around the board was left in place until the material set. While the material was setting attempts were made to screed the material.

The neat material easily flowed all the way down the board and could not be screeded up the 5 percent incline because of its dilatant property at any time prior to setting.

The slurry containing magnesium sulfate had to be puddled using a spatula to get the slurry to flow. Once on the board, the slurry would not flow unless it was again puddled. After sufficient material was on the board and puddled slightly, the material was screeded to the full ⅝-inch thickness. When the screed bar was brought down the slope, the bottom frame member was knocked off. No material flowed out and all the material remained at its full ⅝-inch thickness, even though the board was at a 5 percent incline. This material screeded very smooth with no skip marks, pulling, or air pockets. Once a final pass was made with a screed bar, no finishing had to be done because the material set to a smooth finish. After the final screeding pass on the board using the cement containing magnesium sulfate, all the frame members were removed; and even though the material had not set, the material remained at its full ⅝-inch thickness.

EXAMPLE 2

To a neat cement slurry as set forth in Example 1 was added a quantity of crystallized magnesium sulfate. For this evaluation, the consistency used was intentionally dropped to 22 cc. Because this drop in consistency also affects the dilatancy, the amount of magnesium sulfate was reduced from 8–10 lb./ton to 5–6 lb./ton when the magnesium sulfate was added to the mixed slurry and 7–8 lb./ton (for same wet distribution and flow characteristics) when the magnesium sulfate was dry blended into the neat cement. This drop in consistency was to take maximum advantage of high green strength and dry strength for slush casting. Aliquots of the materials were placed into thin wall latex molds of the type presently being used in slush casting shops. The molds had previously been treated with a slight amount of mold dressing to eliminate air bubbles on the surface of the cast.

The material performed well as a thixotropic material which would air-dry to a high compressive strength in a slush casting operation. It was observed that so long as energy was being applied, i.e., as the slush cast mold was being filled and agitated, the slurry flowed over the surface, filling all of the voids in the mold. Once the input of energy was ceased, i.e., as agitation was stopped, the material stopped flowing and started to body up thus giving a uniform covering of the mold surface inside the cast. After the cast had set, no artificial drying was required because of the low amount of excess water due to casting at almost theoretical minimum water level.

EXAMPLE 3

In a comparative evaluation of different chemical additives, various chemicals were added to a neat cement dry blend of 1,880 lb./ton of alpha calcium sulfate hemihydrate; 100 lb./ton of Type I portland cement; 10–15 lb./ton of LOMAR D dispersant; and a small amount of sodate retarder to adjust the 300 gram Vicat set to about 19 minutes.

A 50 gram sample of the dry neat cement was wetted in 12.5 cc. of mixing water to provide a 25 cc. consistency, for 1 minute, then the material was mixed by hand for 1 additional minute. The chemical being evaluated was then added, and the entire slurry mixed for 1 additional minute. The slurry was then poured into a 1-inch diameter by 2-inch high cylinder and screeded flush to the surface, then the cylinder was lifted to pour from a height of about 1–½ inch onto a plate to form a patty of the slurry. The diameter of the resulting patty was then measured. A patty whose diameter measured about 1 inch to 1¼ inch was considered to provide no flow. The patty was then used to take 300 gram Vicat set measurements. Exemplary results are set forth in Table I. In Table I the amount of chemical added is given on a basis of pounds of additive per ton of formulation. Increasing amounts of the additives in addition to providing thixotropic properties, must not appreciably affect set time as far as lengthening set time, and a desirable set time for the materials being evaluated was less than that of the control.

Table I

| Additive | Amount (lb./ton) | Spread Test Patty Diameter (in inches) | Vicat set (in minutes) |
|---|---|---|---|
| Control - no additive | — | 4 ½ inches | 24 minutes |
| Magnesium sulfate heptahydrate | 2 lb./ton | 4 | 21 |
|  | 4 | 3 ¾ | 19 |
|  | 10 | no flow | 15 |
| Aluminum ammonium sulfate | 10 | 3 ¾ | 17 |
|  | 20 | 2 ½ | 14 |
|  | 24 | 1 ¾ | 12 |
| Monocalcium phosphate | 2 | 3 ¾ | 26 |
|  | 4 | 2 | 26 |
|  | 10 | no flow | 31 |
| Dicalcium phosphate | 10 | 4 | 23 |
|  | 20 | 4 | 26 |
|  | 30 | 4 | 29 |
| Tricalcium phosphate | 10 | 4 | 22 |
|  | 20 | 3 ¾ | 21 |
|  | 30 | 3 ¾ | 17 |
| Potassium sulfate | 10 | 3 ½ | 19 |
|  | 16 | 2 ¼ | 15 |
|  | 20 | 2 | 14 |
| Sodium sulfate | 4 | 3 ½ | 24 |
|  | 6 | 3 | 17 |
|  | 10 | 2 ¼ | 13 |

From the results set forth in Table I it can be clearly seen that magnesium sulfate was the only material which provided thixotropic properties at a reasonable level of usage and did not unreasonably affect set time of the resultant slurry. It is generally considered that when amounts in any excess over 10 lb./ton must be added that the quantity necessary is so large as to be uneconomical and will not be considered as an effective additive.

EXAMPLE 4

Besides imparting thixotropic characteristics to the formulation and not unduly lengthening setting time, the additives must not adversely affect green strength and dry strength of the cementitious mass. Accordingly a number of different chemicals were evaluated using the preparation, mixing and testing procedures set forth in Example 3, except that the slurry consistency was changed to 24 cc. In addition, 1 hour and dry compressive strengths of the samples were taken by ASTM Method C–472. Typical results are set forth in Table II.

Table II

| | Strength Test at 24 cc. Amount lb./ton | | Vicat | 1 hr. psi | dry psi |
|---|---|---|---|---|---|
| Control | — | | 23 | 5142 | 11,679 |
| Magnesium sulfate heptahydrate | 4 | | 20 | 4722 | 12,533 |
|  | 6 | | 17 | 4322 | 12,083 |
|  | 10 | | 14 | 4962 | 13,088 |
| Magnesium sulfate, anhydrous | 6 | (2 ½") | 18 | 5052 | 11,471 |
|  | 8 | (1 ¼") | 15 | 5196 | 11,267 |
| Mono sodium phosphate | 1 | | 27 | 4780 | 11,083 |
|  | 4 | | 28 | 3763 | 9,808 |

Table II-Continued

| | Strength Test at 24 cc. Amount lb./ton | Vicat | 1 hr. psi | dry psi |
|---|---|---|---|---|
|  | 6 | 27 | 3212 | 8,536 |
|  | 10 | 25 | 2254 | 8,488 |
| Potassium phosphate monobasic | 6 | 24 | 4148 | 10,654 |
|  | 10 | 24 | 2663 | 8,150 |

As can be seen from Table II, only the magnesium sulfate materials provided both a thixotropic characteristic in low amounts of additive and maintained or even increased compressive strength of the cast materials.

EXAMPLE 5

In an additional evaluation a neat cementitious mass was formulated to contain, on a percentage by dry weight basis, about 50 percent alpha calcium sulfate and about 50 percent Type I portland cement. Aliquots of the dry blend mixed with water to normal consistency (about 27 cc.) did not exhibit dilatancy. Aliquots of the dry blend to which had been added on a dry weight basis about 0.5 percent a water soluble salt condensate of naphthalene sulfonic acids and formaldehyde fluidizing agent and mixed with water to normal consistency (about 27 cc.) were very dilatant. To aliquots of the dry blend containing the fluidizing agent were added varying amounts from about 0.2 percent to about 0.5 percent on a dry weight basis of crystallized magnesium sulfate. When these blends were mixed with water to normal consistency (about 27 cc.) they exhibited very thixotropic characteristics.

While the present invention has been described and exemplified with respect to certain specific embodiments, it is not to be considered limited thereto; and it is understood that modifications and variations thereof, obvious to those skilled in the art, may be made without departing from the spirit or scope thereof. For example, as is well known in the art, cementitious materials which are to be applied by hand should have a thicker consistency than materials adapted for pumping, spraying and other machine handling or application. Thus the use consistency may vary widely. Further, known additives may be included in customary amounts to modify various properties of the cementitious materials. Thus air entrainers, foam control agents, fillers and various aggregates, and the like may be incorporated. In some instances it may be desired that a minor proportion of a calcium sulfate hemihydrate or portland cements accelerator or retarder or mixtures thereof be present in order to vary the setting time of the cementitious mass. Similarly any dispersing or fluidizing agent for calcium sulfate hemihydrate or portland cements may be used in place of the ones specified hereinabove with substantially equivalent results; and the amount of such fluidizing agent may vary widely depending on the particular one used.

What is claimed is:

1. A process for imparting thixotropic characteristics to dilatant cementitious masses of alpha calcium sulfate hemihydrate-portland cement and minor amounts of a dispersing agent comprising the step of adding to the cementitious mass a minor amount by weight of magnesium sulfate.

2. The process of claim 1 in which the magnesium sulfate is magnesium sulfate heptahydrate.

3. The process of claim 1 in whichh the magnesium sulfate is added to a dry cementitious mass.

4. The process of claim 1 in which the cementitious mass is mixed with water to form an aqueous slurry; and the magnesium sulfate is added to the aqueous slurry.

5. The process of claim 1 in which the cementitious mass is mixed with water to form a pumpable aqueous slurry; the slurry is pumped; and the magnesium sulfate is added to the slurry being pumped.

6. The process of claim 1 in which the cementitious mass contains by weight, on a dry weight basis, about 49–94 percent alpha calcium sulfate hemihydrate; about 49–5 percent portland cement; and about 0.5–0.8 percent dispersing agent; and about 0.2–0.5 percent magnesium sulfate heptahydrate is added thereto.

7. A thixotropic, settable, plastic mass comprising an aqueous slurry of alpha calcium sulfate hemihydrate; portland cement; a minor amount of dispersing agent; and a minor amount of magnesium sulfate.

8. A thixotropic, settable, plastic mass according to claim 7 in which the magnesium sulfate is magnesium sulfate heptahydrate.

9. A thixotropic, settable, plastic mass according to claim 7 containing by weight on a dry weight basis about 0.5–0.8 percent of dispersing agent and about 0.2–0.5 percent of magnesium sulfate.

10. A thixotropic, settable, plastic mass according to claim 8 containing by weight on a dry weight basis about 49–94 percent of alpha calcium sulfate hemihydrate and about 49–5 percent of portland cement.

11. A dry mixture capable of setting on the addition of water and exhibiting thixotropic characteristics on the addition of water comprising alpha calcium sulfate hemihydrate; portland cement; a minor amount by weight of dispersing agent; and a minor amount by weight of magnesium sulfate.

12. A dry mixture according to claim 11 containing by weight about 49–94 percent of alpha calcium sulfate hemihydrate; about 49–5 percent of portland cement; about 0.5–0.8 percent of dispersing agent; and about 0.2–0.5 percent of magnesium sulfate heptahydrate.

* * * * *